United States Patent [19]

Parrini et al.

[11] 4,324,831

[45] Apr. 13, 1982

[54] FORMED STRUCTURES BASED ON SYNTHETIC FIBERS AND HAVING SOUNDPROOFING PROPERTIES

[75] Inventors: Paolo Parrini; Vittorio Ciaccia; Guglielmo Corrieri; Gian P. Righi, all of Ferrara, Italy

[73] Assignee: Montedison S.p.A., Milan, Italy

[21] Appl. No.: 25,712

[22] Filed: Mar. 30, 1979

Related U.S. Application Data

[63] Continuation of Ser. No. 894,258, Apr. 7, 1978, abandoned, which is a continuation of Ser. No. 743,418, Nov. 19, 1976, abandoned, which is a continuation of Ser. No. 631,524, Nov. 13, 1975, abandoned.

[30] Foreign Application Priority Data

Nov. 14, 1974 [IT] Italy ............................... 29435 A74

[51] Int. Cl.$^{3}$ ........................ B32B 27/12; D04H 1/58

[52] U.S. Cl. .................................... 428/288; 428/296; 428/340; 428/378; 428/394; 428/396; 428/407; 428/903; 181/294; 252/62

[58] Field of Search ............... 428/288, 392, 394, 903, 428/402, 327, 297, 296, 360, 340, 378, 396, 407; 181/294; 252/62

[56] References Cited

U.S. PATENT DOCUMENTS

| | | | |
|---|---|---|---|
| 2,574,849 | 11/1951 | Talalay | 428/360 |
| 3,005,795 | 10/1961 | Busse et al. | 525/935 X |
| 3,853,608 | 12/1974 | Hammer et al. | 428/288 |
| 3,914,497 | 10/1975 | Kanehira et al. | 428/288 |
| 3,935,046 | 1/1976 | Kiernan et al. | 428/300 X |

*Primary Examiner*—George F. Lesmes
*Assistant Examiner*—Alexander S. Thomas

[57] ABSTRACT

Formed structures comprising synthetic thermoplastic fibrils or fibrids having a surface area (specific surface) higher than 1 $m^2/g$ and useful for soundproofing purposes are provided. Methods for making the structures are also disclosed.

7 Claims, No Drawings

FORMED STRUCTURES BASED ON SYNTHETIC FIBERS AND HAVING SOUNDPROOFING PROPERTIES

This is a continuation of Ser. No. 894,258 filed Apr. 7, 1978, now abandoned, which is in turn a continuation of Ser. No. 743,418, filed Nov. 19, 1976, now abandoned, and which in its turn is a continuation of Ser. No. 631,524, filed Nov. 13, 1975, now abandoned.

THE PRIOR ART

By now the use of prefabricated structures or panels as thermal, electrical and acoustical insulation is universally accepted in industrial technology, in particular in that of buildings. The prefabricated structures are used for such purposes as insulating machines, apparatuses of different kinds, dwellings, public buildings, places of entertainment, etc.

Heretofore, such structures have been prepared from materials belonging to the following groups: fibrous materials of mineral nature, such as glass wool and rock wool; woody materials, such as wood shavings; foamed polymeric materials such as foamed polystyrene, polyurethanes, polyvinyl chloride, etc.

The panels made of mineral wool offer many advantages inasmuch as those panels combine good phonoabsorption and phonoinsulating properties due to the open, non-compacted nature of the material, with considerable resistance to atmospheric agents and to high temperatures. Moreover, they have good thermal insulating capacity. However, the mineral wool panels and the like have the drawback of being rather heavy and of requiring the use of particular glues for binding the fibers.

Panels formed of wood shavings, which have the advantages of light weight and of being economical, are those having the lowest antiacoustical and thermoinsulating properties and, in addition the disadvantage of being sensitive to humidity and thus of being subject to attack by mildew and bacteria.

The panels and the like constructed of foamed polymers, due to their internal structure formed of numerous small, isolated or intercommunicating cavities are very light in weight but their phonoabsorption and phonoinsulating capacities are rather poor. Typical is the case of foamed polystyrene which is satisfactory as a thermoinsulating material but not as a phonoinsulating material.

THE PRESENT INVENTION

One object of this invention is to provide prefabricated panels and the like having exceptional anti-acoustical characteristics.

This and other objects are attained by the invention which provides new prefabricated structures comprised of synthetic thermoplastic fibrils or fibrids having a surface area (specific surface) greater than 1 $m^2/g$.

By fibrils or fibrids as the terms are used herein are meant oblong, non-granular fibrous entities having a mean diameter comprised, in general, between 1 and 400 microns.

The length of the fibrils or fibrids is not critical to obtaining the prefabricated articles of this invention and having anti-acoustical, or soundproofing, properties. In general, the length may be comprised between 1 mm and 50 mm.

Said fibrils or fibrids are of the kind known to be particularly suitable for preparing synthetic paper on conventional paper-making equipment.

Various processes are known for preparing fibrils and fibrids of polymeric material and having a surface area greater than 1 $m^2/g$.

According to British Pat. No. 868,651, fibers of this type are obtained by precipitating the polymer from a solution thereof by addition of a non-solvent to a zone in which the solution is subjected to shearing forces.

The fibrids thus obtained are so small that not more than 10% are retained by a classing screen of 10 mesh (meshes of 2 mm.), at least 90% being retained by a screen of 200 mesh (meshes of 0.07 mm.) when the Clark classification method (Tappi 33,294-8, No. 6, June 1950) is used.

According to British Pat. No. 1,287,317, polyolefinic fibers of similar morphology, having a surface area greater than 1 $m^2/g$, are obtained by polymerizing the olefin in the presence of co-ordination catalysts and in a reaction medium in which the polymer is subjected to the action of shearing forces. The fibers so obtained have a mean diameter, or width, ranging from 20 microns to a few hundred microns, while the length is comprised between 0.2 mm. and 25 mm. or higher.

Other methods for obtaining fibrils of polymeric materials consist in extruding a solution, emulsion, dispersion or suspension of the polymer through an orifice into at least one liquid medium under pressure and temperature conditions such that evaporation of the liquid in the extrusion ambient occurs instantaneously (flash-spinning processes), and the polymer is precipitated in the form of numerous fibrils connected to each other to form more or less continuous tridimensional fibrous structures (plexofilaments) having a superficial area greater than 1 $m^2/g$ and possessing a microfibrous structure, i.e., a structure which consists of strands or layers of microfibers having a diameter, or width, of less than 1.0 micron.

Processes of the last-mentioned kind which, for example, can be used for obtaining fibrils useful in the practice of the present invention by starting with homogeneous solutions of the polymers in organic solvents therefor, emulsions of the polymers in solvents and non-solvents such as water, or with dispersions of the molten polymers in solvents and/or nonsolvents are described in British Pat. Nos. 891,943 and 1,262,531; in U.S. Pat. Nos. 3,402,231, 3,081,519, 3,227,784, 3,227,794, 3,770,856, 3,740,383 and 3,808,091; in Belgian Pat. No. 789,808; in French Pat. No. 2,176,858 and in German patent application No. 2,343,543.

The fibrous aggregates, or the plexofilaments, obtained according to the "flash-spinning" method can be easily disgregated, by cutting and beating, into elemental fibrous products (fibrils) having a surface area (specific area) greater than 1 $m^2/g$ and which are generally used in the manufacture of synthetic paper. British Pat. No. 891,945 discloses a method for obtaining such elemental fibrous products (plexofilament fibrils) by disgregation of plexofilaments obtained by the "flash-spinning" of polymer solutions.

According to a more recent method described in Montedison Italian Pat. No. 947,919, single fibrils of the type suitable for use in the practice of this invention are obtained directly by extruding a solution of an olefin polymer under flash conditions into a zone in which it is hit, at an angle to the direction of extrusion and at high speed, by a jet of gaseous fluid.

As disclosed herein, we have found that fibers of the type defined hereinabove provide prefabricated panels and the like which have antiacoustical properties that are exceptionally high and unexpectedly superior to those of any structures previously suggested for use as, or which have been used as, phonoabsorption and phonoinsulating materials.

This invention attains one of the objects thereof by providing agglomerates endowed with remarkable antiacoustical, or soundproofing, properties having an apparent density of between 0.04 and 0.5 g/cc, obtained from fibrils or fibrids of thermoplastic polymers having a superficial area greater than 1 $m^2/g$, and a binder for such fibrils or fibrids, the weight ratio between the fibrils or fibrids and the binder being comprised between about 95:1 and about 50:50.

The invention also provides a process for the preparation of the agglomerates which consists in preparing a mixture of fibrils or fibrids of thermoplastic polymers having a surface area greater than 1 $m^2/g$ with a potentially adhesive binder, at a weight ratio in the dry state between the fibrils or fibrids and the binder of from about 95:5 to about 50:50, to obtain a mixture having an apparent density of from 0.04 to 0.5 g/cc, and then developing the adhesive properties of the binder.

The fibrils or fibrids can be formed of any thermoplastic polymer including polyolefins, polyamides, polystyrenes, polyoxymethylenes, polyacrylonitriles, polyacrylates, polyvinylchlorides, copolymers of ethylene and propylene, and copolymers of ethylene and alkylacrylates.

The fibrils or fibrids may contain mineral fillers such as kaolin, silicon, calcium sulphate, talc, calcium carbonate, and titanium dioxide, which do not adversely affect the sound-deadening properties of the finished structures, which properties substantially derive from the structure and surface area of the constituent fibrous material.

The presence of such fillers in the fibrils or fibrids promotes the adhesion of the prefabricated panels or the like to masonry work by means of mortar, concrete, plaster, etc., thereby considerably facilitating installation of the panels or other formed structures. In addition, said fillers act as fire-proofing agents for the fibrils and fibrids and may be required in the case of highly inflammable polymers like polystyrene.

The binders for the fibrils may be animal or vegetable glues. Preferably, however, the binder is a synthetic resin applied as a dispersion or solution in an aqueous medium or in some other solvent or liquid dispersant which is not a solvent for the fibrils.

Examples of synthetic resins which can be used include epoxy resins, unsaturated polyester resins, polyvinyl acetate, polyvinyl alcohol, and the like.

As binders there may also be used thermoplastic polymers which are compatible with the polymer of which the fibrils or fibrids are made and which have a melting temperature lower than the melting temperature of the fibrils or fibrids. These binders are mixed with the fibrils in the form of a powder having a granulometry preferably comprised between 50 microns and 500 microns, in the form of short fibers or, better still, in the form of fibrils or fibrids the length and diameter of which is preferably of the same magnitude as the length and diameter of the fibrils forming the soundproofing portion of the panel or the like.

When binders of the last-mentioned type are used, dimensional stability of the mixture is obtained by heating it at a temperature midway between the melting temperature of the polymeric binder and that of the soundproofing polymeric fibrils or fibrids.

The fibrils and binder may be mixed in the dry state, i.e., in the absence of liquid vehicles, in mixers or carding machines, especially when soft, flexible end products are desired, or the mixing can be carried out in the humid or wet state which may be necessary when the binder is one which must be used as a dispersion or solution in a liquid vehicle. In this latter embodiment, the soundproofing fibrils and the solution or dispersion of the binder are dispersed in water, optionally containing small quantities of wetting agents, the mixture being homogenized under stirring and then filtered.

Because the soundproofing fibrils have a high absorptivity for the binder, practically all of the binder remains in the fibrous mass so that the preparation of mixtures of predetermined composition does not present any serious difficulties.

However the binder is introducted, it must be in the mixture thereof with the soundproofing fibrils or fibrids in a weight ratio, in the dry state, comprised between about 5:95 and about 50:50. Said ratio may vary within the limits stated depending on the mechanical characteristics desired for the dimensionally stabilized end products compatibly with the critical value of the apparent density of the mixtures in the dry state, which must be comprised between about 0.04 and about 0.5 g/cc, and preferably between about 0.05 and 0.25 g/cc.

Parameters which contribute to determination of the density of the mixture, and thus of the agglomerates and formed structures (panels or the like) of this invention are, in addition to the morphology and quantity of the binder, the length of the fibrils and the method used for preparing the mixtures of the fibrils and binder.

In general, the longer the fibrils the lower the apparent density of the mixtures and agglomerates (final products). Mixtures having the lowest apparent density with the smallest quantity of binder are obtained when the soundproofing fibrils or fibrids are mixed with the binder in the dry state.

While the apparent density values of about 0.04 to about 0.5 g/cc are critical, it is not sufficient for the final panel or other formed article to have an apparent density in that range to obtain such articles having the exceptional soundproofing properties. In addition to the apparent density value in the stated range, it is necessary for the panel or other formed structure to contain a suitable quantity of binder which, besides rendering the panel or the like dimensionally stable, serves to weld the fibrils to each other with formation of cavities and micro-cells in which the sound waves are and remain trapped and dampened due to the extremely ragged structure of the fibrils.

On the other hand, we have found that when the apparent density of the mixture is lower than 0.04 g/cc, the soundproofing or sound-deadening capacity of the panel or the like is markedly reduced, even when the by weight fibrils/binder ratio is very low, e.g., lower than 50:50. The same loss of soundproofing effectiveness occurs when the apparent density is greater than 0.5 g/cc even when the by weight ratio of fibrils to binder is low, i.e., less than 5:95.

Flexible, soft agglomerates of high anti-acoustical properties are obtained by the dry-mixing procedure and using, as the binder, fibrils and/or fibrids formed of a low-melting material. Under these circumstances, panels or the like having the best soundproofing characteristics are obtained using high-melting fibrils/low-melting fibrils (binder) in a by weight ratio comprised between 90:10 and 70:30.

Agglomerates obtained by mixing the two types of fibrils together in similar by weight ratios by the wet method also have high anti-acoustical properties but are less flexible than those obtained by the dry mixing.

When the binder is a low-melting material in powder form, flexible end products of high soundproofing properties are obtained using nixtures of the soundproofing fibrils and binder in weight ratios comprised between 95:5 and 85:15. Semi-rigid products still having anti-acoustical properties which are considerably superior to those of any products heretofore available are obtained using the binder in powder form and fibrils/binder weight ratios comprised between 75:25 and 50:50.

Using the wet-mixing method, with the binder in the form of a solution or emulsion, semi-rigid agglomerates having superior anti-acoustical properties can be obtained at weight fibrils/binder ratios in the mixture in the dry state comprised between 95:5 and 85:15, while self-supporting rigid agglomerates also having superior anti-acoustical characteristics can be obtained at weight fibrils/binder ratios of about 50:50.

The fibrils/binder mixtures may be used for preparing formed structures of various types and sizes by carrying out their agglomeration in containers of the desired shape, or by applying the mixture and effecting the agglomeration in situ, when it is desired to isolate spaces of irregular surface or outline, such as walls, machines, and apparatuses in general.

Fibrils/binder mixtures dispersed in water or other inert liquid are particularly suitable for use in the last-mentioned applications since, with such mixtures, it is possible to prepare soundproofing agglomerates and structures of very different density and characteristics.

The adhesive properties of the binder can be developed in different ways, depending on the type of binder used. Thus, the adhesiveness can be developed by simple evaporation, at room temperature, of the solvent or vehicle or carrier in which the binder is dissolved or dispersed, or it may be developed by drying or fusion of the binder at a temperature lower than the melting temperature of the fibrils which form the mass of insulating material. At any rate, the agglomeration of the fibrils resulting from the adhesiveness of the binder occurs without any appreciable variation of the apparent density of the mixture, which density remains substantially unaltered in the end product, which is the agglomerated mass or shaped articles of desired shape and size formed thereof.

The agglomerates, and the end structures of the desired shape and size formed thereof, and which have the exceptional sound-absorbing and sound-insulating capacities, also have excellent thermal and electrical insulating properties. This makes them particularly adapted to use wherever multiple insulation is desired, such as, for example, in rooms of homes, offices, restaurants, etc. In such applications, simple panels or similarly-shaped articles formed of the fibrils/binder agglomerates of the invention are sufficient to provide the multiple insulation required without its being necessary to resort to superimposing different panels of similar thickness and each consisting of a specific insulating material on one another, as has been required heretofore, as for instance the superimposition of mineral wool panels on foamed polyurethane panels, etc. and which is cumbersome and involves extra labor and the use of large quantities of insulating material.

The agglomerates or shaped articles of the invention can be cut or sawed with standard tools, and may be welded by the conventional techniques for welding thermoplastic polymers. Moreover, it is possible to increase the rigidity of the articles by superficial fusion while at the same time giving them a smooth, finished surface which may be embossed to impart an aesthetic aspect thereto. In addition, the agglomerates and shaped articles may be variously colored by using fibrils or fibrids prepared from pigmented thermoplastic polymers.

The following examples are given for purely illustrative purposes and are not intended to be limiting.

The values of sound absorption, sound insulation, thermal conductivity and of the electrical properties of the panels which are given in the examples were determined on samples of circular panels having a diameter of 10 cm and a thickness of 2 cm, by the following methods:

sound absorption by means of a Kundt tube, according to ISO 140 Standards, in the field of frequencies comprised between 125 and 2000 Hz: The values are expressed as $\alpha$ 0.100, wherein $\alpha$ is the absorption coefficient;

sound insulation according to ISO 140 Standards, with a frequency of 1000 Hz: completely insulating the sound intensity meter from the sound source by means of a wall formed of said samples, having a surface area of 8.8 sq. m, and lined with an aluminum foil 1 mm thick. The values are expressed in decibels and express the minimum intensity of the sound source that may be received by the meter through the door.

thermal conductivity: according to ASTM D177/63;
dielectric constant: according to ASTM D150/7;
loss factor: according to ASTM D150/7;
volume resistivity: according to ASTM D257/66;
dielectrica rigidity: according to ASTM D149/64.

EXAMPLE 1

Into a 50 lt autoclave provided with a heating sleeve and fitted with a stirrer, were loaded 3 kg of polyethylene (density=0.950, M.I.=4.4, melting temperature=135° C.), and 35 lt of technical n-hexane. The autoclave was then heated up until a solution of the polymer in the hexane was obtained, operating under the following conditions:

temperature:—145° C.
pressure:—5.5 kg/sq. cm

Under these conditions, the solution was extruded into the outer surrounding atmosphere at a rate of about 100 lt/hr, through a circular nozzle with a diameter of 2 mm, the solution being hit, at about 3 mm from the nozzle orifice, by a jet of dry saturated steam flowing out of a nozzle having a diameter of 4 mm, arranged at a right angle to the direction of extrusion of the polymer solution, with an impact speed of about 470 m/sec.

Thereby, a fibrous product was obtained which, under an optical microscope, proved to be formed of individual fibrils with a length comprised between 4 and 6 mm, a thickness of from 30 to 40 micron and with a surface area of 6 $m^2/g$.

Using the same equipment, fibrils were prepared starting from a solution of 2.2 kg of polypropylene having an isotacticity index of 94% (M.I.=10, density=0.908, melting temperature=170° C.) in 30 lt of technical n-hexane and maintained under the following conditions:
temperature = 155° C.
pressure = 5.0 kg/sq. cm The conditions for the formation of the fibrils were as follows:
extrusion rate: 45 lt/hr
velocity of the dry saturated steam: 470 m/sec.

The fibrils thus obtained were 3–6 mm long, 35–45 micron thick and had a surface area of 4.5 m/hu 2/g.

The propylene fibrils were homogenously mixed with the polyethylene fibrils, in a by weight ratio of 80:20, in an open disc mill (mixer). The mixture became perfectly homogenous after 5 minutes of working (processing). This mixture was then uniformly placed in a container consisting of a metal net of 500 meshes/sq. cm, of square shape with 50 cm sides, the mixture forming a compact, homogenous and uniform layer having an apparent density = 0.05 g/cc and a thickness of 2 cm.

The container was placed in a forced hot air oven where it was kept for 10 minutes at 150° C. After this period, a flexible panel was obtained having a thickness of 2 cm, a density of 0.05 g/cc and a porous structure.

The characteristics of this panel are recorded in Table 1.

EXAMPLE 2

Polypropylene and polyethylene fibrils like those of Example 1 were dispersed in water containing small quantities of polyvinyl alcohol as wetting agent, under stirring and in a ponderal ratio of 80:20, thereby obtaining a dispersion with a concentration of 30 g of fiber/lt of water. After 10 minutes of stirring, the fibrils of polyethylene were perfectly dispersed amongst the polypropylene fibrils.

This dispersion was then pumped into the metal net containers of Example 1, thereby obtaining 2 cm thick humid panels. After drying in an oven at 120° C. for about 60 minutes, the panels showed a density of 0.09 g/cc.

The dried panels were then placed for 10 minutes at 150° C. in a forced hot air oven. The resulting panels had a thickness of 2 cm and a density of 0.09 g/cc. These panels have the characteristics recorded in Table 1.

EXAMPLE 3

In a 50 lt autoclave there was prepared a solution of 3.4 kg of a polyethylene of the high density type (M.I. = 5, melting temperature = 135° C., density = 0.95) in 35 lt of n-hexane containing 0.05% of Lubrol PEX (surfactant), at a temperature of 180° C. and under autogenous pressure.

Under said conditions, the solution was extruded through a nozzle of 3 mm diameter and 3 mm length, thereby obtaining a plexofilament consisting of unitary fibrils of 20–40 micron diameter.

The plexofilament was placed in a horizontal disc refiner of the "Defibrator" type with comparator at 65, fed with water at room temperature. The relationship of the plexofilament with respect to the water was 1%; the refining was carried on for 15 minutes.

Thereby was obtained a paste that consisted of unitary fibrils having a length of from 4 to 6 mm, a mean diameter of 20–40 micron and a surface area of 7.5 $m^2/g$. 75 parts by weight of these fibrils were then mixed together in water with 25 parts by weight of low density polyethylene fibrils (M.I. = 10, melting temperature = 110.5° C., density = 0.91) with a mean diameter comprised between 20 and 30 micron, a length of from 2 to 4 mm and a surface area of 4 $m^2/g$, prepared according to the method and procedures described in Example 1, starting from a solution of 3 kg. of polyethylene in 30 lt of pentane, under the following conditions;
temperature = 150° C.
pressure = 15 kg/sq. cm.

The concentration of fibers in the dispersion was 20 g/lt.

By operating as in Example 2, with that dispersion were prepared humid panels of 2 cm thickness, which after complete drying in an oven for 12 hours at 90° C., showed an apparent density of 0.08 g/cc.

By a subsequent treatment in an oven at 125° C. for 60 minutes, there were obtained flexible and compact panels showing an apparent density of 0.08 g/cc, and having the characteristics recorded in Table 1.

EXAMPLE 4

Polypropylene fibrils having the same characteristics as those of Example 1 were homogeneously mixed, in a disc mill like the one used in Example 1, with low density polyethylene fibrils as described in Example 3. The polypropylene fibrils/low density polyethylene fibrils weight ratio was 90/10.

The mixture thus obtained was placed in the usual metal molds to thereby obtain panels having a thickness of 2 cm and an apparent density equal to 0.048 g/cc. After treatment at 155° C. for 5 minutes in an oven, flexible, compact panels were obtained of unaltered density and having the characteristics shown in Table 1.

EXAMPLE 5

High density polyethylene fibrils like those described in Example 3 were homogeneously mixed together in a by weight ratio of 70/30 with polyethylene of the low density type (M.I. = 20, melting temperature = 109° C., density = 0.91), in form of a powder having a mean granulometry of about 50 micron, in the disc mill of Example 1.

With this mixture were then prepared, in the usual molds of metal netting, 3 cm thick panels of an apparent density of 0.15 g/cc, which, after heating in an oven for 90 minutes at 125° C., showed a density of 0.15 g/cc and a semi-rigid consistency. Their characteristics are recorded in Table 1.

EXAMPLE 6

Using high density polyethylene fibrils as described in Example 3, there was prepared an aqueous dispersion having a fibrils concentration of 30 g/lt, and which contained 2.4% by weight of polyvinyl acetate in emulsified form.

The dispersion was maintained under stirring for 10 minutes, after which it was introduced into the metal net molds described in Example 1 to form pressed panels of 2.5 cm thickness and of an apparent density, after drying at 120° C. for 2 hours, equal to 0.25 g/cc. During this operation, the polyvinyl acetate was substantially completely absorbed by the fibers.

The panels thus obtained were of a rigid structure. The characteristics thereof are reported in Table 1.

For comparison, the characteristics of panels of similar dimensions but consisting, respectively, of polystyrene and of rock wool, are also recorded in Table 1. The polystyrene panels had an apparent density of 0.009 g/cc and consisted of polystyrene granules, formed and thermically welded together. The rock wool panels were prepared from the rock wool normally used for anti-acoustical purposes by impregnation with epoxy resin followed by drying in an oven. The dried panels had a density of 0.08 g/cc.

TABLE 1

| | Examples | | | | | | Comparison Samples | |
|---|---|---|---|---|---|---|---|---|
| | 1 | 2 | 3 | 4 | 5 | 6 | Foamed Polystyrene | Rock Wool |
| Sound absorption at 250 Hz (α 100) | 6 | 8 | 6 | 20 | 12.5 | 6 | 5 | 5 |
| Sound absorption at 500 Hz (α 100) | 25 | 20 | 25 | 45 | 25 | 17 | 5 | 14 |
| Sound absorption at 1000 Hz (α 100) | 52 | 48 | 58 | 65 | 31 | 33 | 23 | 25 |
| Sound absorption at 2000 Hz (α 100) | 80 | 80 | 92 | 86 | 56 | 71 | 20 | 45 |
| Sound insulation at 1000 (decibel) | 35 | 34 | 40 | 45 | 38 | 34 | 12 | 35 |
| Thermal conductivity (Cal/$m^2$ . h . °C.) | 0.05 | 0.04 | 0.025 | 0.03 | 0.037 | 0.037 | 0.06 | 0.046 |
| Electrical properties at 1000 Hz | | | | | | | | |
| Volume resistivity (Ω cm) | $1.8 \cdot 10^{15}$ | $9 \cdot 10^{14}$ | $1 \cdot 10^{15}$ | $3 \cdot 10^{15}$ | $3.1 \cdot 10^{14}$ | $1.7 \cdot 10^{15}$ | $3 \cdot 10^{15}$ | $2 \cdot 10^{13}$ |
| Loss factor (tg δ) | $3.6 \cdot 10^{-4}$ | $3.8 \cdot 10^{-3}$ | $3 \cdot 10^{-4}$ | $3 \cdot 10^{-4}$ | $2.8 \cdot 10^{-3}$ | $4 \cdot 10^{-3}$ | $5 \cdot 10^{-3}$ | $1 \cdot 10^{-3}$ |
| Dielectrical constant | 1.3 | 1.4 | 1.2 | 1.1 | 1.2 | 1.3 | 1.1 | 2.8 |
| Dielectrical rigidity (KV/mm) | 2.2 | 1.8 | 1.6 | 2 | 2.1 | 1.75 | 2.4 | 1.1 |

We claim:

1. Homogeneous agglomerates having anti-acoustical properties and an apparent density comprised between 0.04 and 0.5 g/cc, said agglomerates consisting essentially of mixtures of fibrils or fibrids of thermoplastic polymers having a surface area greater than 1 $m^2/g$, and in the range 4.5 $m^2/g$ to 7.5 $m^2/g$ and a binder therefor selected from the group consisting of animal or vegetable glues, synthetic resins and thermoplastic polymers which are compatible with the polymer of which the fibrils or fibrids of the agglomerate are formed and have a melting temperature lower than the melting temperature of the fibrils or fibrids, the weight ratio between the fibrils or fibrids and binder being comprised between about 95:5 and about 50:50.

2. Formed structures for use as sound-absorbing and sound-insulating means and consisting essentially of agglomerates according to claim 1.

3. Panels for use as sound-absorbing and sound-insulating means and consisting essentially of agglomerates according to claim 1.

4. Agglomerates according to claim 1, wherein said fibrils or fibrids consist predominantly of isotactic polypropylene.

5. Agglomerates according to claim 1, wherein said fibrils or fibrids consist of polyethylene.

6. Agglomerates according to claim 1, and formed of fibrils or fibrids of predominantly isotactic polypropylene and fibrils or fibrids of polyethylene.

7. Agglomerates according to claim 1, in which the binder for the fibrils or fibrids is a thermoplastic polymer having a melting temperature lower than the melting temperature of the thermoplastic polymer from which the majority of the fibrils or fibrids are formed.

* * * * *